United States Patent
Rupprecht et al.

(10) Patent No.: US 6,887,142 B2
(45) Date of Patent: May 3, 2005

(54) TOOL RECEPTACLE FOR A GRINDING TOOL

(75) Inventors: Hans Rupprecht, Munich (DE); Manfred Jakob, Kaufering (DE); Georg Holzmeier, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 52 days.

(21) Appl. No.: 10/319,222

(22) Filed: Dec. 13, 2002

(65) Prior Publication Data

US 2003/0114092 A1 Jun. 19, 2003

(30) Foreign Application Priority Data

Dec. 17, 2001 (DE) .......................................... 101 61 930

(51) Int. Cl.$^7$ ............................................. B24B 45/00
(52) U.S. Cl. ..................................... 451/359; 451/508
(58) Field of Search ................................ 451/359, 508, 451/509, 342, 259, 548

(56) References Cited

U.S. PATENT DOCUMENTS

| | | | |
|---|---|---|---|
| 3,912,411 A | 10/1975 | Moffat | |
| 4,637,170 A * | 1/1987 | Block | .......................... 451/342 |
| 4,980,994 A * | 1/1991 | Helm et al. | ................. 451/342 |
| 5,772,373 A | 6/1998 | Cronin, II | |
| 6,116,996 A * | 9/2000 | Yanase | ........................ 451/359 |

* cited by examiner

Primary Examiner—Robert A. Rose
(74) Attorney, Agent, or Firm—Sidley Austin Brown & Wood, LLP

(57) ABSTRACT

A grinding tool, in particular a concrete grinding tool, comprising a drive spindle (1) driven by a motor in the working rotational direction (A) having a tool receptacle (7) at its free end. The tool receptacle (7) is provided with a flange (2) non-rotationally disposed on the drive spindle (1) and a nut (3) that can be threaded onto the free end (6) for clamping the tool (5) against the flange (2). The tool receptacle (7) further comprises an anti-rotation device (4) that prevents a rotation of the tool (5) relative to the drive spindle (1) in the working direction of rotation (A) of the drive spindle (1).

9 Claims, 2 Drawing Sheets

TOOL RECEPTACLE FOR A GRINDING TOOL

BACKGROUND OF THE INVENTION

The invention relates to a grinding device comprising a drive spindle motor driven in a working rotational direction and having, at its free end, a tool receptacle comprising a rotationally-fixed flange fastened to the drive spindle and a nut that is threadable onto the free end for clamping a tool against the flange.

Grinding tools of the type described above comprise a tool receptacle for clamping a tool. For this purpose a nut is threaded on a drive spindle. The nut clamps the tool longitudinally on the drive spindle against a flange non-rotationally mounted on the drive spindle.

DE 4 432 973 A1 discloses a grinding tool comprising a working spindle driven by a motor in a working rotational direction. The working spindle comprises at its free end a tool receptacle, which is provided with a flange rotationally fixedly fastened to the drive spindle and a nut threadable on the free end for clamping a tool against the flange.

The drawback in the known solution is that the nut can loosen and fall away from the drive spindle. The nut can become loose on the drive spindle and release the tool, particularly, when a braking device is used for braking the drive spindle rotating in a working direction within a short time.

SUMMARY OF THE INVENTION

The object of the present invention is to provide a grinding tool that is inexpensive to manufacture comprised of a tool receptacle for detachably fastening a tool and preventing the loosening of the nut by the torque acting upon the tool in the direction of working. This object is achieved according to the invention by a tool receptacle comprising an anti-rotation contrivance, which prevents a rotating of the tool relative to the drive spindle in the working rotational direction of the drive spindle.

By virtue of the anti-rotation, a rotation of the tool relative to the drive spindle, in the working rotational direction of the drive spindle, is prevented and therewith a loosening of the nut, which in the clamped state co-operates form-lockingly and/or friction-lockingly with the tool.

The anti-rotation preferably comprises at least one stop shoulder mounted non-rotationally relative to the drive spindle and acting opposite to the working direction to assure a direct coupling of the rotational motion of the drive spindle with the anti-rotation.

The anti-rotation is advantageously configured as a spring element that pre-stresses the tool towards the free end of the drive spindle to enable backlash-free movement of the tool in the tool receptacle. When clamping the tool in the tool receptacle, the spring element enables placement of the tool abutting the nut and thus eliminates any existing clearance between the two parts. Such an arrangement assures that any loosely disposed nut threaded onto the drive spindle is secured against falling of by the spring element on the drive spindle.

The spring element is mounted preferably between the flange and the tool to assure compact and dust-tight receiving of the tool. Furthermore, the flange, being non-rotationally connected with the drive spindle, allows a structurally simple and robust mounting of the anti-rotation device.

The spring element is advantageously configured as at least one elastic tab on a retainer ring disposed on the flange to assure the inexpensive manufacture of the retainer ring and the elastic tab. In a further embodiment, the retainer or locking ring is manufactured with the elastic tab(s) out of one piece of metal plate.

The locking ring is preferably rotationally fixedly disposed on the flange to assure a constructively simple rotationally-fixed arrangement of the locking ring relative to the drive spindle.

Advantageously, the free end of the elastic tab extends substantially in the direction towards the free end of the drive spindle to pre-stress the tool at the free end of the drive spindle.

The stop shoulder is preferably formed by the front end of the free end of the elastic tab to assure inexpensive manufacture of the anti-rotation.

The tool advantageously comprises at least one counter-shoulder corresponding to the stop shoulder, which can be formed in the tool from a profiling, for example.

A counter-shoulder preferably formed by perforations in the tool assures an inexpensive manufacture of the tool receptacle.

Advantageously, the tool comprises a tool locking device, which prevents a rotation of the tool relative to the drive spindle in the working direction of rotation of the drive spindle. By configuring a tool locking device on the tool, the tool receptacle is structurally simpler and therefore more economical to manufacture.

Preferably, the tool locking device comprises at least one stop shoulder disposed non-rotationally relative to the drive spindle and acting opposite to the working direction.

BRIEF DESCRIPTION OF THE DRAWINGS

The invention is more completely described in the following with reference to two exemplary embodiments, wherein.

DETAILED DESCRIPTION OF THE PREFERRED EMBODIMENTS

Figure 1:
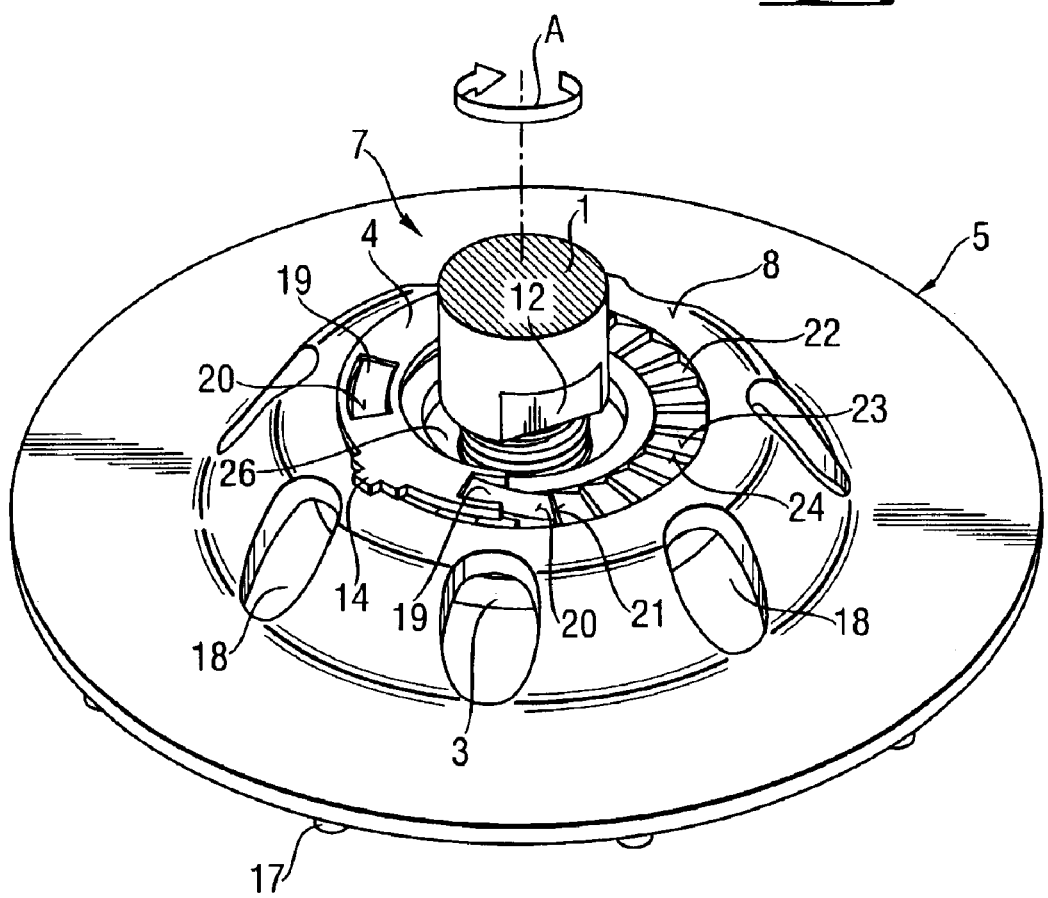
FIG. 1 shows a perspective partial view of a tool receptacle with a first embodiment of a tool without a flange.
Figure 2:
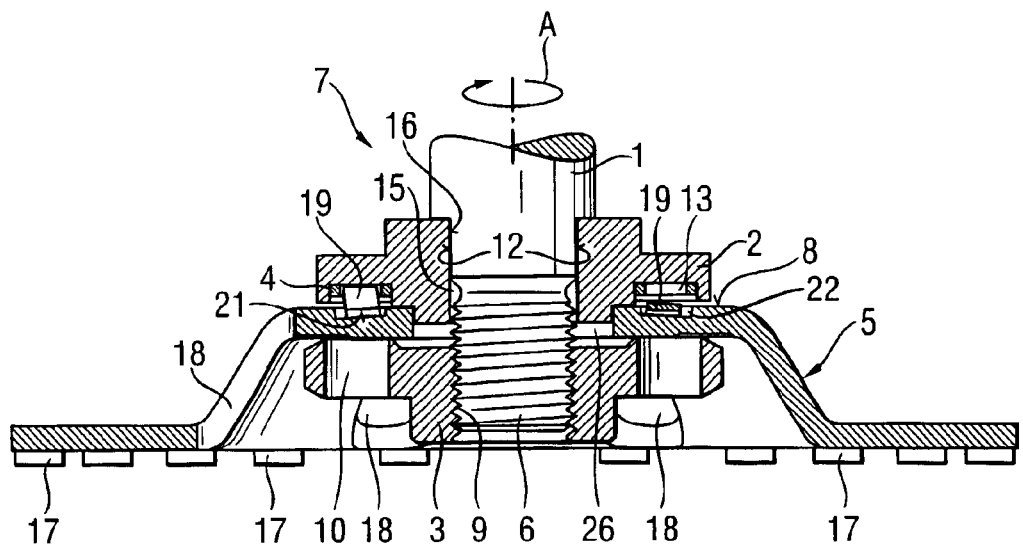
FIG. 2 shows a cross-section of the tool receptacle represented in FIG. 1 with a flange and with a tool clamped in the tool receptacle.
Figure 3:
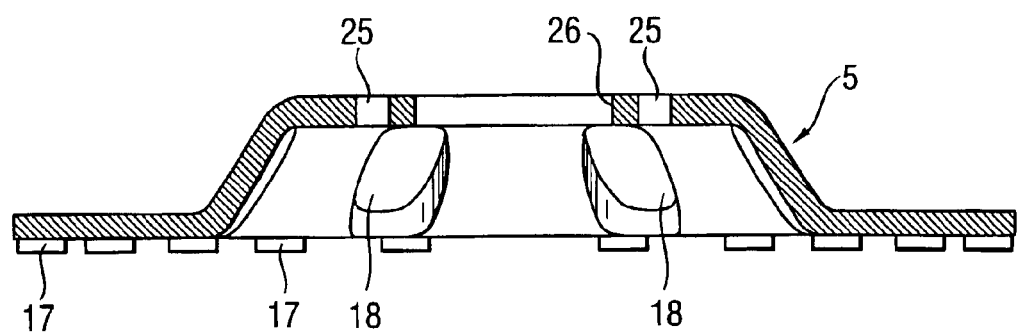
FIG. 3 represents a second embodiment of a tool.

FIGS. 1 to 3 represent two embodiments of a grinding tool according to the invention, in particular, a concrete grinding tool comprising a drive spindle 1 driven by a motor in a working rotational direction A, said tool having at a free end 6 a tool receptacle 7. The tool receptacle 7 is provided with a non-rotationally arranged flange 2 on the drive spindle 1 and a nut 3 threaded onto the free end 6 for claming a tool 5 against the flange 2. Further, the tool receptacle 7 comprises an anti-rotation device that prevents a rotation of the tool 5 relative to the drive spindle 1 in the working rotational direction A of the drive spindle 1.

The nut 3 comprises a T-shaped longitudinal groove. In the radially outer zone, the nut 3 has a plurality of engagement bores 10, shown particularly in FIG. 2, which serve as engagement means for loosening the nut, which can be disposed removably by a thread connection 9 on the drive spindle.

The substantially disk-like flange 3 comprises a central guide bore 15 for passage of the drive spindle 1. The guide bore 15 comprises two webs 16 running parallel, diametrically to each other and on an outer periphery, which co-operate with recesses 12 arranged complementarily thereto on the drive spindle 1 and bear the flange 2 non-rotationally on the drive spindle. At a radial outer side facing the free end 6, the flange 2 comprises an annular, laterally open configured annular recess 13 for bearing the locking ring 4 as an anti-rotation. The annular locking ring 4 engages by two driver webs 14 disposed diametrically to each other into driver slots (not shown) that are complementary to the webs, which provide the flange 2 with a rotationally-fixed connection between the drive spindle 1 and the anti-rotation 4.

The locking ring 4 disposed between the flange 2 and the tool 5 comprises four bent resilient tabs 19, as spring elements acting in the longitudinal direction of the drive spindle 1, extending opposite to the working rotational direction A, to the free end 6 of the drive spindle 1.

The pot-like configured tool 5 having a circular cross-section comprises, on its side facing away from the free end 6 of drive spindle 1, a plurality of abrasive members 17, diamond particles for example, and, approximately centrally, a receiving bore hole 26. In the radially outer zone, a plurality of through passages 18 are provided running in the longitudinal direction to the drive spindle 1. On the side 8 facing the locking ring 4, the tool 5 comprises profiling with which the face end 21, acts as a stop shoulder, of the free ends 20 of the resilient tabs 19.

In a first embodiment represented in FIGS. 1 and 2, the profiling is formed by a sawtooth profile. The sawtooth profile 22 comprises a plurality of ramp surfaces 23 and connection surfaces 24, whereby the connection surfaces 24 run slightly inclined along the longitudinal axis of the drive spindle. The connection surfaces 24, in the first embodiment, form the counter-shoulders for the stop shoulders, in particular the front surfaces 21 of the resilient tabs 19.

In a second embodiment, represented in FIG. 3, the tool 5 comprises several perforations 25 whose walls serve as the counter-shoulder for the stop shoulders, in particular the front surfaces of the resilient tabs 19. Preferably, the perforations 25 are formed as perforating bore holes and are arranged evenly distributed over the periphery of the tool 5.

What is claimed is:

1. A grinding tool comprising a drive spindle (1) driven by a motor, in a working rotational direction (A), a tool receptacle (7) at a free end, a flange (2) non-rotationally disposed on the drive spindle (1) and a nut (3) threadable onto the free end (6) for clamping the tool (5) against the flange (2), wherein the tool (5) comprises a plurality of abrasive members 17 and wherein the tool receptacle (7) comprises an anti-rotation device that prevents a rotation of the tool (5) relative to the drive spindle (1) in the working rotational direction (A) of the drive spindle (1), wherein the anti-rotation device (4) is a spring element that pre-stresses the tool (5) towards the free end (6) of the drive spindle (1).

2. The grinding tool of claim 1, wherein the spring element is disposed between the flange (2) and the tool (5).

3. The grinding tool of claim 1 or 2, wherein the spring element is configured as at least one resilient tab (19) of a locking ring (4) [sic] arranged on the flange (2).

4. The grinding tool a of claim 3, wherein the locking ring (4) is non-rotationally mounted on the flange (2).

5. The grinding tool of claim 3, wherein the free end (20) of the resilient tab (19) extends substantially to the free end (6) of the drive spindle (1).

6. The grinding tool of claim 3, wherein the stop shoulder is formed by the front side (21) of the free end (20) of the resilient tab (19).

7. The grinding tool of claim 1, wherein the anti-rotation device (4) comprises at least one stop shoulder disposed non-rotationally relative to the drive spindle (1) and acting opposite to the working direction (A).

8. The grinding tool of claim 7, wherein the tool (5) comprises at least one counter-shoulder corresponding to the stop shoulder.

9. The grinding tool of claim 8, wherein the counter-shoulder is formed by perforations (25) in the tool.

* * * * *